(12) United States Patent
Goossens et al.

(10) Patent No.: US 7,548,493 B2
(45) Date of Patent: Jun. 16, 2009

(54) EXTENDED FOCUS CONTROL

(75) Inventors: Hendrik Josephus Goossens, Shanghai (CN); Frank Cornelis Penning, Turnhout (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 431 days.

(21) Appl. No.: 10/556,449

(22) PCT Filed: May 12, 2004

(86) PCT No.: PCT/IB2004/050641

§ 371 (c)(1),
(2), (4) Date: Nov. 10, 2005

(87) PCT Pub. No.: WO2004/102550

PCT Pub. Date: Nov. 25, 2004

(65) Prior Publication Data

US 2007/0008839 A1    Jan. 11, 2007

(30) Foreign Application Priority Data

May 16, 2003    (EP)    .................. 03101386

(51) Int. Cl.
*G11B 7/08* (2006.01)
(52) U.S. Cl. .................. 369/44.29; 369/53.28
(58) Field of Classification Search .......... None
See application file for complete search history.

(56) References Cited

U.S. PATENT DOCUMENTS

| | | | |
|---|---|---|---|
| 3,970,935 A * | 7/1976 | Beery et al. .................. 324/166 |
| 4,695,158 A | 9/1987 | Kotaka et al. | |
| 4,901,300 A | 2/1990 | Van Der Zande et al. | |
| 5,187,699 A | 2/1993 | Raaymakers et al. | |
| 5,247,165 A * | 9/1993 | Hiruta et al. ............. | 250/201.3 |
| 5,642,340 A | 6/1997 | Nomura | |
| 5,740,138 A * | 4/1998 | Hoshino et al. .......... | 369/44.29 |
| 5,864,526 A * | 1/1999 | Le Carvennec .......... | 369/44.29 |
| 6,314,069 B1 | 11/2001 | Ceshkovsky | |
| 6,452,878 B1 * | 9/2002 | Graffouliere ............. | 369/44.34 |
| 6,538,982 B1 | 3/2003 | Van Vlerken et al. | |
| 6,584,048 B1 * | 6/2003 | Tateishi et al. .......... | 369/44.28 |
| 6,724,561 B1 * | 4/2004 | Wyman ................... | 360/77.12 |
| 6,798,725 B1 * | 9/2004 | Horibe et al. ............ | 369/47.14 |

FOREIGN PATENT DOCUMENTS

EP    1220210 A    7/2002
JP    07006372    1/1995

OTHER PUBLICATIONS

ISR: PCT/IB04/050641.
Written Opinion: PCT/IB04/050641.

* cited by examiner

*Primary Examiner*—Andrea L Wellington
*Assistant Examiner*—Michael V Battaglia

(57) ABSTRACT

An apparatus for scanning a track on a record carrier has a head (41) for providing a beam of radiation and generating at least one sensor signal. The device has a focusing unit for controlling a focusing element to maintain an in-focus position for generating a focused spot on the track. The sensor signal is converted into a displacement signal by a multitude of piecewise converters (42, 43, 44), each converter converting a range of the sensor signal values into a position signal, and selection means (46) for selecting one of the position signals as the displacement signal based on an estimated displacement.

14 Claims, 6 Drawing Sheets

Figure 2:
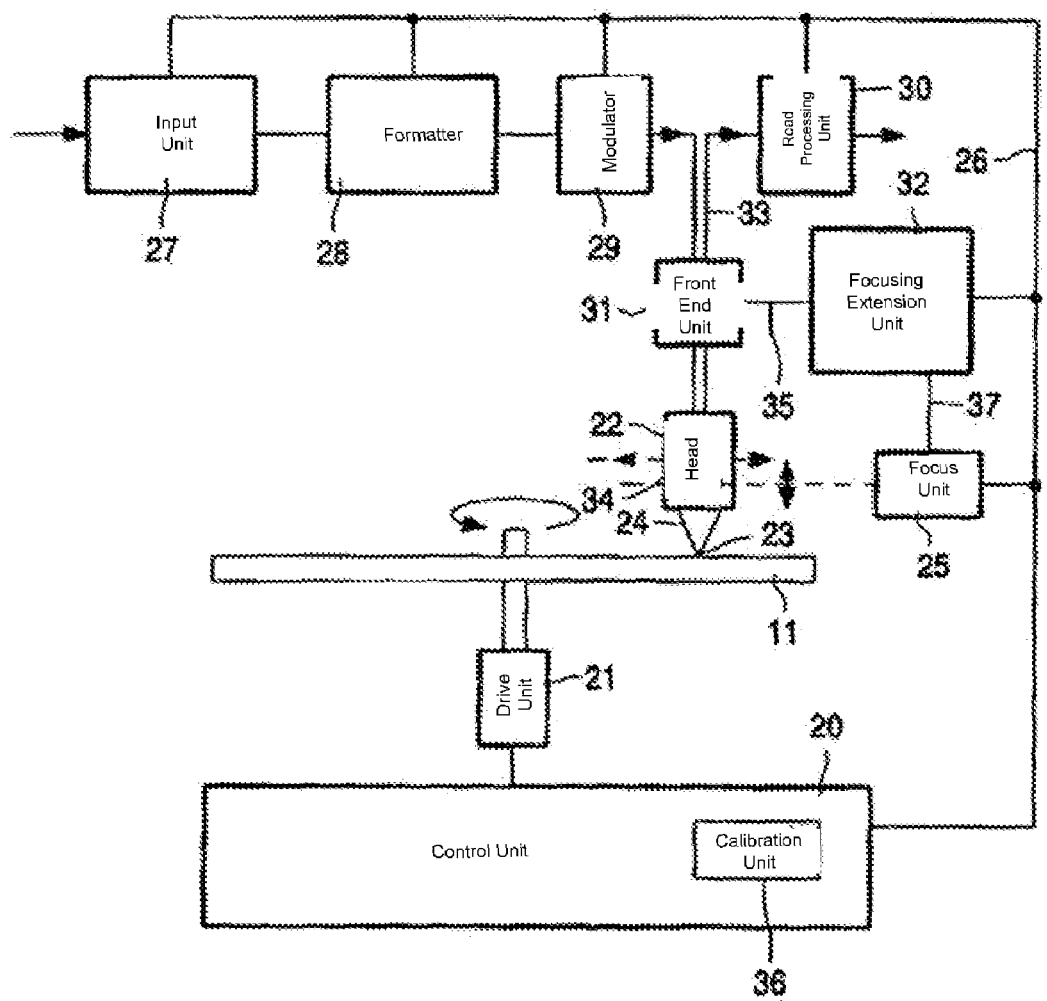

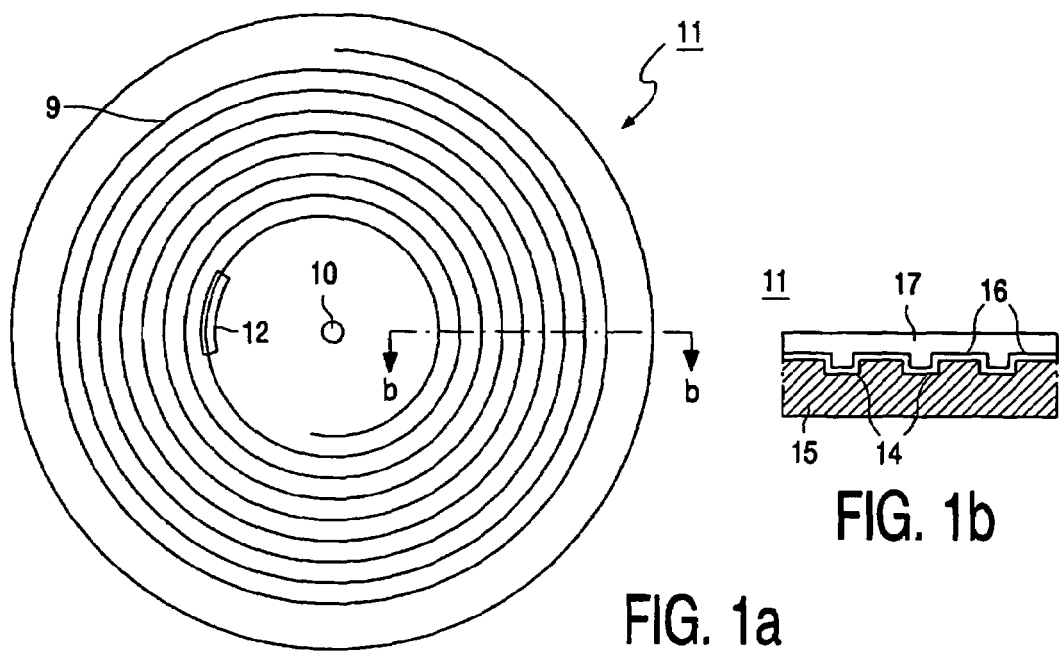
FIG. 1a
FIG. 1b
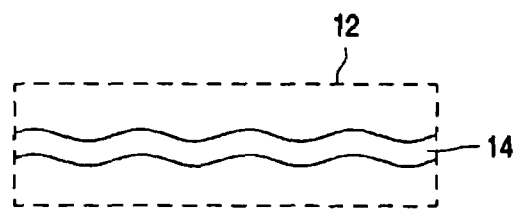
FIG. 1c

EXTENDED FOCUS CONTROL

The invention relates to a device for scanning a track on a record carrier via a beam of radiation, the track comprising marks representing information, the device comprising a head for providing the beam and generating at least one sensor signal, the head comprising a focusing element, a focusing unit for controlling the focusing element to maintain an in-focus position for generating a focused spot on the track in dependence on a displacement signal based on the sensor signal, the displacement signal being indicative of a displacement of the focusing element with respect to an in-focus position, the sensor signal having overlapping ranges of sensor signal values for different ranges of the displacement.

The invention further relates to a method of scanning a track on a record carrier via a beam of radiation, the track comprising marks representing information, the method comprising generating at least one sensor signal, controlling a focusing element to maintain an in-focus position for generating a focused spot on the track in dependence on a displacement signal based on the sensor signal, the displacement signal being indicative of a displacement of the focusing element with respect to an in-focus position, the sensor signal having overlapping ranges of sensor signal values for different ranges of the displacement.

A device and method for scanning a track and reading information are known from U.S. Pat. No. 6,314,069. The device has a head for providing a beam of radiation focused on a track. A read signal is generated for reading information represented by marks in a track on a record carrier like an optical disc. An error signal representing a displacement of a focusing element from an in-focus position is produced based on two detector signals from a detector. The detector signals are presumed to have a periodical characteristic relative to the displacement. A servo system responsive to the error signal controls the focusing element to bring the beam to the in-focus position. A local feedback loop is coupled to the detector signals, and the error signals (that are shifted in phase) are coupled via two periodic function generators to two multipliers, which multiply the detector signals by the output of the periodic function generators. The output of the multipliers is coupled to the circuit to modify the error signal. As a result the operational range of the focus servo loop is extended to a range of displacements outside a limited working range around the nominal in-focus position. A problem of the known device is that two out-of-phase detector signals having a periodic characteristic are required, and that the focus range extension of displacements outside the limited working range is not accurate.

Therefore it is an object of the invention to provide a device and method for scanning a record carrier having an accurate extended focus range.

According to a first aspect of the invention the object is achieved with a device as defined in the opening paragraph, characterized in that the device comprises a multitude of piecewise converters, each converter converting a range of the sensor signal values into a position signal, and selection means for selecting one of the position signals as the displacement signal based on an estimated displacement.

According to a first aspect of the invention the object is achieved with a method as defined in the opening paragraph, the method comprising converting a multitude of ranges of the sensor signal values into a multitude of position signals, and selecting one of the position signals as the displacement signal based on an estimated displacement.

The effect of the piecewise converting is that relevant ranges of sensor signal values are converted by dedicated converters. The selection of the relevant position signal is based on the estimated displacement. This has the advantage that operation of the focus servo system is extended more accurately outside a substantial linear range around the in-focus position, in particular including non-linear ranges having overlapping sensor signal values.

The invention is also based on the following recognition. In prior art systems the focusing system is usually arranged for a substantially linear working region around a nominal position. Outside the linear range, i.e. for larger displacements, the sensor signal decreases constituting inverted and relatively long tail parts of the curve; the total curve usually being called s-curve. The inventors have seen that, although for existing optical disc systems the linear region provides sufficient working range, in high density small form factor optical drives the linear range is relatively small. Hence the drive would be very sensitive to shock, and extension of the working range outside the linear region is attractive. Actually the tail parts cover a range of displacements significantly larger than the linear part. Presuming a periodic characteristic as in the known s-curve extension in U.S. Pat. No. 6,314,069 is highly inaccurate and unduly limits the extension to about twice the size of the linear region.

In an embodiment of the device the selection means comprise an estimator for determining the estimated displacement based on previous values of the displacement signal. The effect is that movement of the focusing element with respect to the track is assumed to continue from the previous samples. This has the advantage that the selection of a position signal is based on a realistic physical model of the focusing element.

In an embodiment of the device at least one of the piecewise converters has a substantially proportional relation between the range of the sensor signal values and the position signal, and at least one of the piecewise converters has a substantially inverse relation between the range of the sensor signal values and the position signal. Thereby the position signal provides displacement values of the focusing element outside the limited linear region of the s-curve. This has the advantage that an inverting function provides a simple and effective translation of a tail of the s-curve to a position signal.

Further preferred embodiments of the device according to the invention are given in the further claims.

Figure 3:
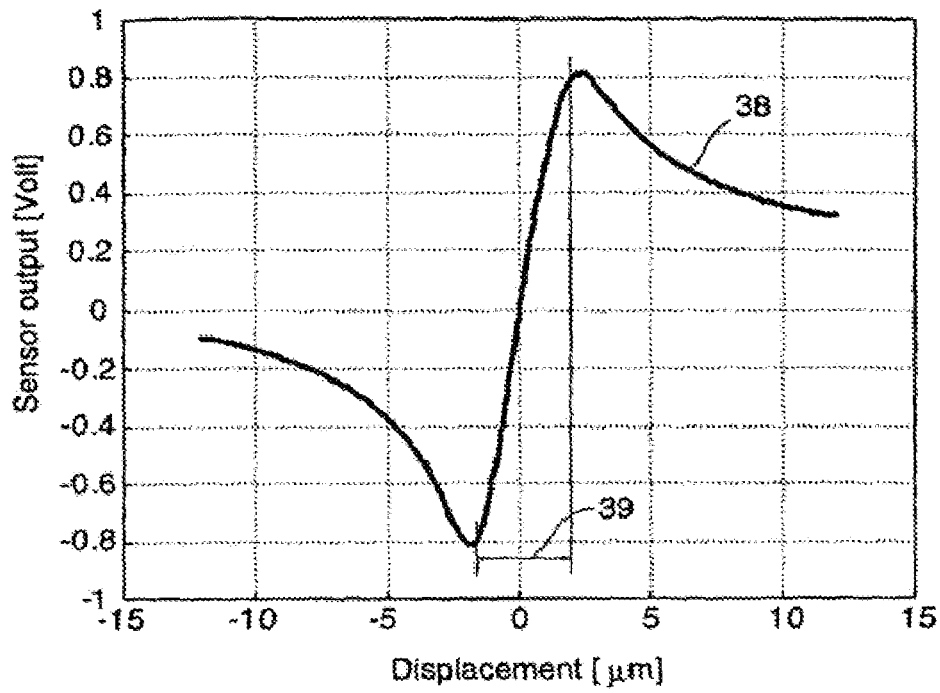
Figure 4:
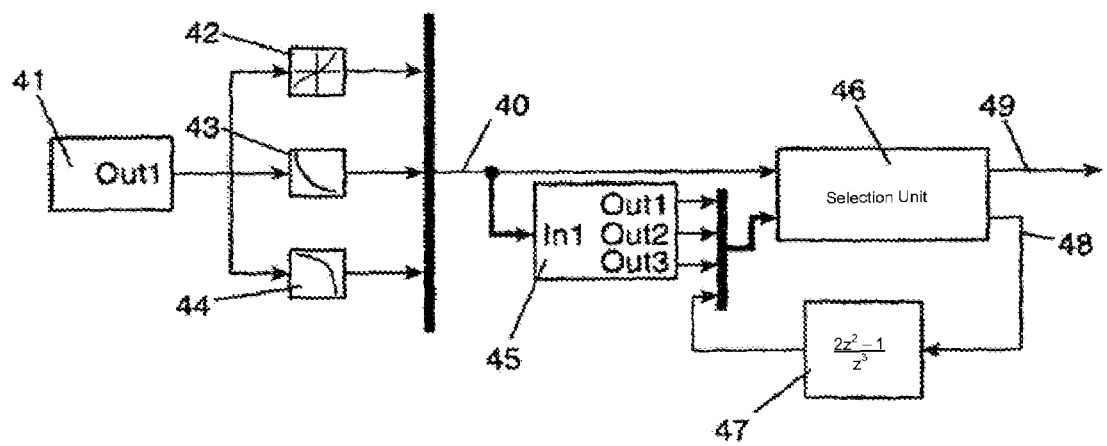
Figure 5:
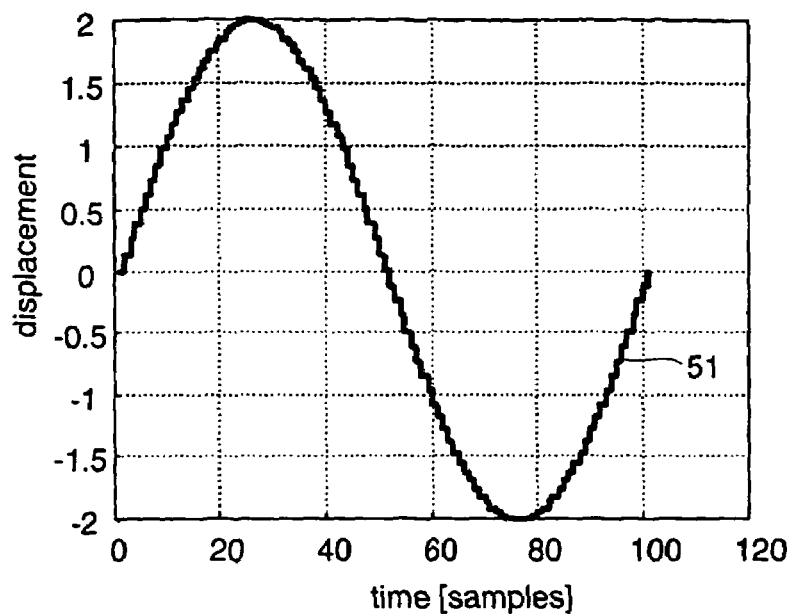
Figure 6:
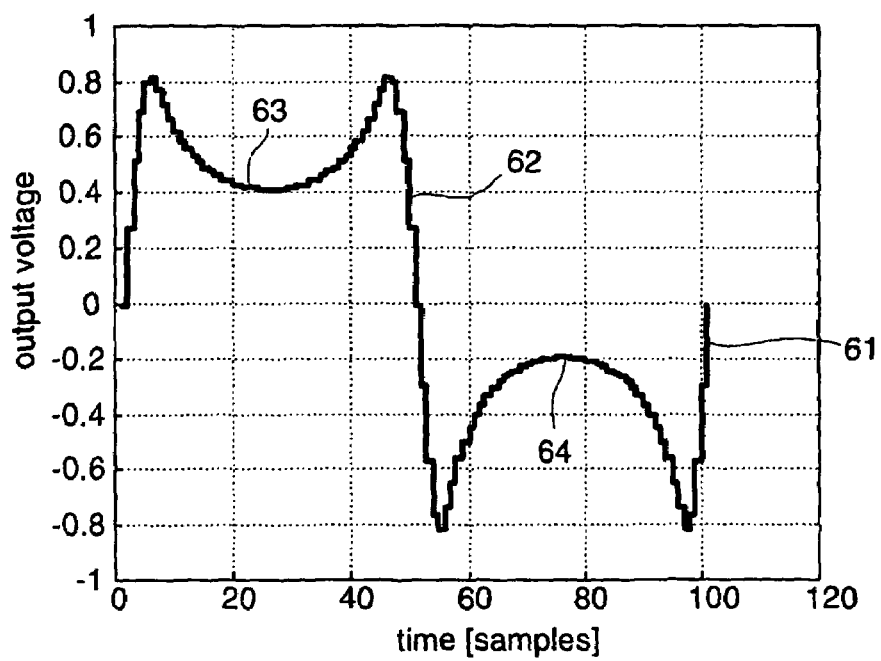
Figure 7A:
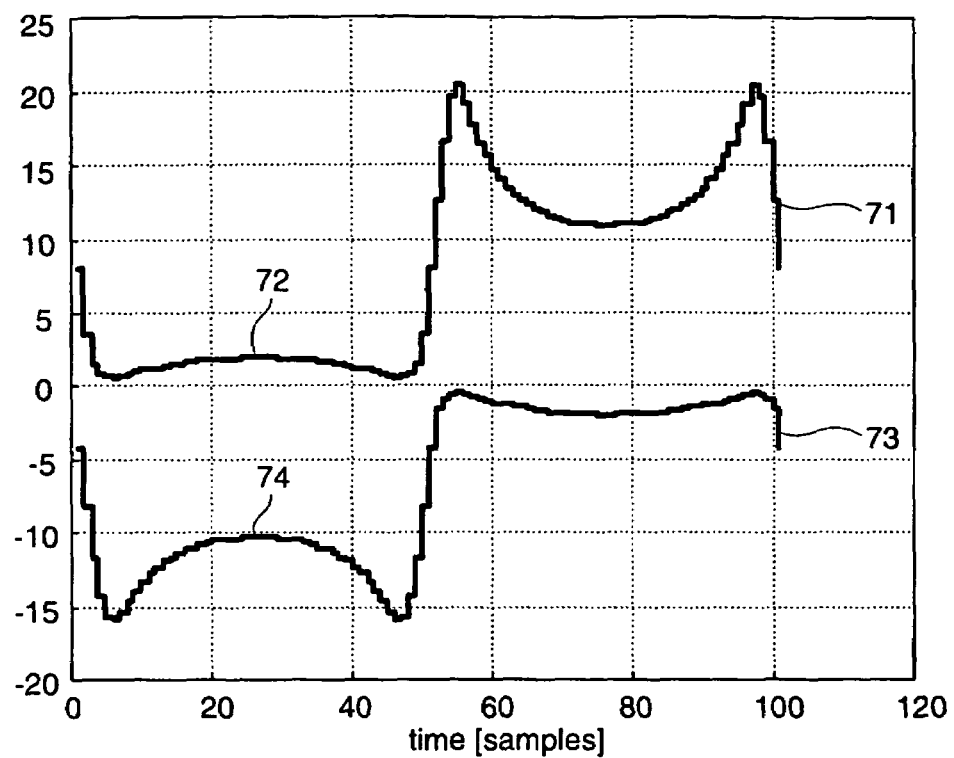
Figure 7B:
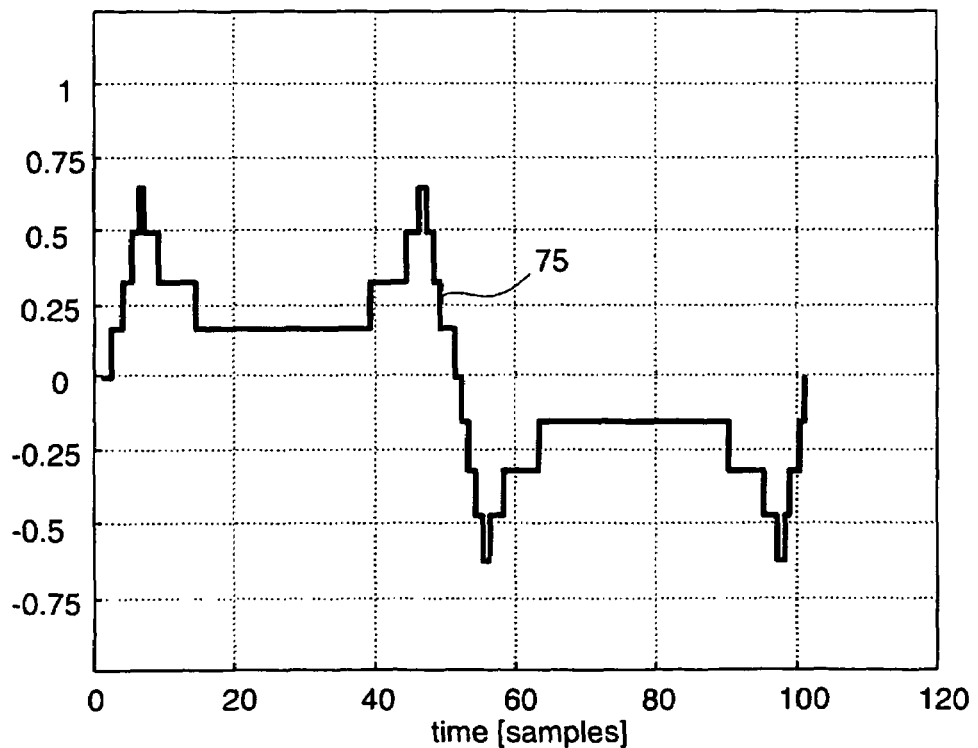
Figure 7C:
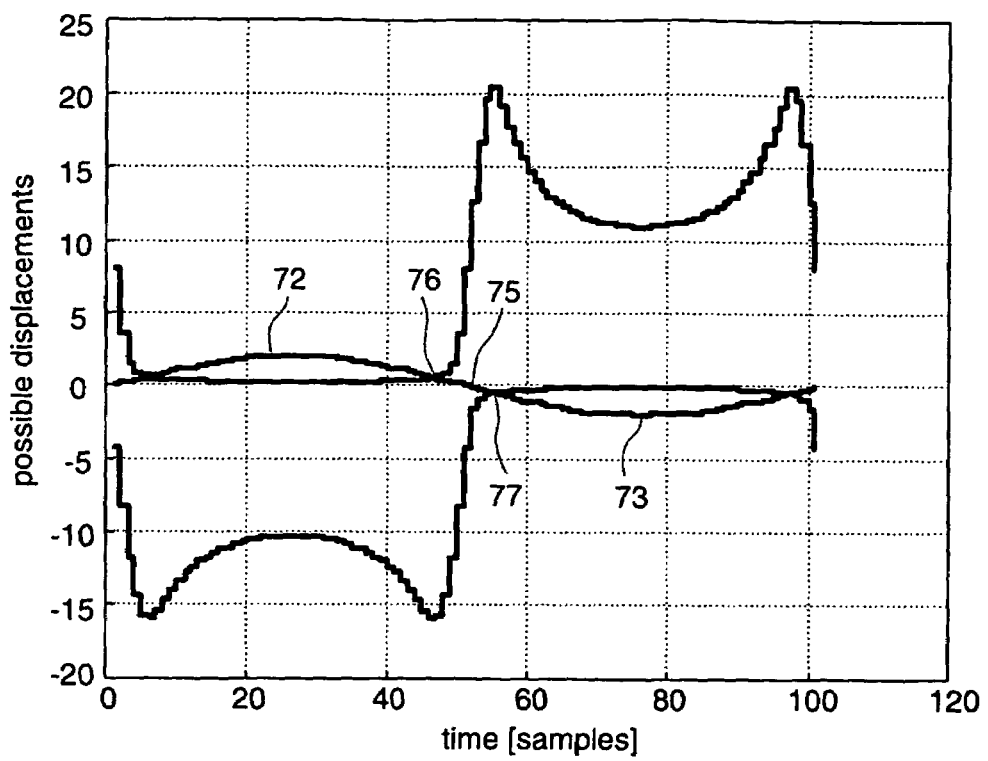
Figure 8:
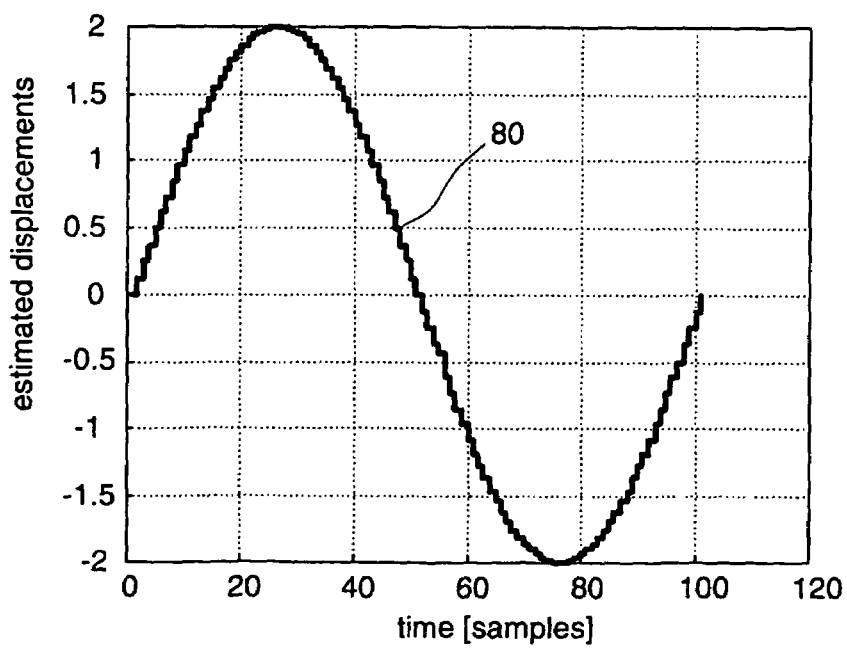

These and other aspects of the invention will be apparent from and elucidated further with reference to the embodiments described by way of example in the following description and with reference to the accompanying drawings, in which FIG. 1a shows a record carrier (top view),
FIG. 1b shows a record carrier (cross section),
FIG. 1c shows a detail of a track,
FIG. 2 shows a scanning device having a focus extension,
FIG. 3 shows a sensor signal of a focus sensor,
FIG. 4 shows a focus extension unit,
FIG. 5 shows displacement of an objective lens,
FIG. 6 shows a sensor signal,
FIG. 7a shows position signals for the tail parts of the s-curve,
FIG. 7b shows a position signal for the central part of the s-curve,
FIG. 7c shows a combination of position signals, and
FIG. 8 shows a reconstructed displacement signal.

In the Figures, elements which correspond to elements already described have the same reference numerals.

FIG. 1a shows a disc-shaped record carrier 11 having a track 9 and a central hole 10. The track 9, being the position of the series of (to be) recorded marks representing information, is arranged in accordance with a spiral pattern of turns constituting substantially parallel tracks on an information layer. The record carrier may be optically readable, called an optical disc, and has an information layer of a read-only or recordable type. Details about the read-only DVD disc can be found in reference: ECMA-267: 120 mm DVD—Read-Only Disc—(1997). Examples of a recordable disc are the CD-R and CD-RW, and writable versions of DVD, such as DVD+ RW, and the high density writable optical disc using blue lasers, called Blue-ray Disc (BD). The information is represented on the information layer by providing optically detectable marks along the track, e.g. pits or crystalline or amorphous marks in phase change material. The track 9 on the recordable type of record carrier is indicated by a pre-embossed track structure provided during manufacture of the blank record carrier. The track structure is constituted, for example, by a pregroove 14 which enables a read/write head to follow the track during scanning. The track structure comprises position information, e.g. addresses.

FIG. 1*b* is a cross-section taken along the line b-b of the record carrier 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. The pregroove 14 may be implemented as an indentation or an elevation of the substrate 15 material, or as a material property deviating from its surroundings.

In an embodiment the record carrier 11 is carrying information representing digitally encoded video according to a standardized format like MPEG2.

FIG. 1*c* shows an example of a wobble of the track. A detail 12 of the track 9 shows a periodic variation of the lateral position of the pregroove 14, also called wobble. The variations cause an additional signal to arise in auxiliary detectors, e.g. in the push-pull channel generated by partial detectors in the central spot in a head of a scanning device. The wobble is, for example, frequency modulated and position information is encoded in the modulation. A comprehensive description of the wobble and encoding information therein can be found for CD in U.S. Pat. No. 4,901,300 (PHN 12.398) and U.S. Pat. No. 5,187,699 (PHQ 88.002), and for the DVD+RW system in U.S. Pat. No. 6,538,982 (PHN 17.323).

FIG. 2 shows a scanning device having a focus extension. The device is provided with means for scanning the track on record carrier 11 which include a drive unit 21 for rotating the record carrier 11, a head 22, a positioning unit (not shown) for coarsely positioning the head 22 in the radial direction on the track and a focusing unit 25 for focusing a radiation beam on the track, and a control unit 20. The head 22 comprises an optical system of a known type for generating the radiation beam 24 guided through optical elements focused to a radiation spot 23 on a track of the information layer of the record carrier. The radiation beam 24 is generated by a radiation source, e.g. a laser diode. The head comprises a focusing element 34, for example an objective lens, controlled by the focusing unit via an actuator for moving the focus of the radiation beam 24 along the optical axis of said beam. The head further comprises a tracking actuator (not shown) for fine positioning of the spot 23 in a radial direction on the center of the track. The tracking actuator may comprise coils for radially moving an optical element or may alternatively be arranged for changing the angle of a reflecting element. For reading the radiation reflected by the information layer is detected by a detector of a usual type, e.g. a four-quadrant diode, in the head 22 for generating detector signals coupled to a front-end unit 31 for generating various scanning signals, including a main scanning signal 33 and error signals 35 for tracking and focusing. The error signals 35 are coupled a focusing extension unit 32 to generate a displacement signal 37 which is coupled to the focus unit 25 for controlling said focusing actuators. The error signals 35 may also be coupled to a pre-track demodulation unit for retrieving the physical addresses and other control information from the pre-track pattern constituted by wobble modulation or pre-pits. The main scanning signal 33 is processed by read processing unit 30 of a usual type including a demodulator, deformatter and output unit to retrieve the information. The focus extension unit 32 is described below with reference to FIG. 4.

In an embodiment the device is provided with recording means for recording information on a record carrier of a re-writable type, for example DVD+RW. The recording means cooperate with the head 22 and front-end unit 31 for generating a write beam of radiation, and comprise write processing means for processing the input information to generate a write signal to drive the head 22, which write processing means comprise an input unit 27, a formatter 28 and a modulator 29. For writing information the beam of radiation is controlled to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of polarization different from their surroundings, obtained when recording in magneto-optical material.

Writing and reading of information for recording on optical disks and formatting, error correcting and channel coding rules are well-known in the art, e.g. from the CD or DVD system. In an embodiment the input unit 27 comprises compression means for input signals such as analog audio and/or video, or digital uncompressed audio/video. Suitable compression means are described for video in the MPEG standards, MPEG-1 is defined in ISO/IEC 11172 and MPEG-2 is defined in ISO/IEC 13818. The input signal may alternatively be already encoded according to such standards.

The control unit 20 controls the recording and retrieving of information and may be arranged for receiving commands from a user or from a host computer. The control unit 20 is connected via control lines 26, e.g. a system bus, to the other units in the device. The control unit 20 comprises control circuitry, for example a microprocessor, a program memory and interfaces for performing the procedures and functions as described below. The control unit 20 may also be implemented as a state machine in logic circuits.

In an embodiment the device has a calibration unit 36 coupled to the control unit for calibrating the focus servo system under the conditions as described below with reference to FIG. 4. In an embodiment the calibrating function is implemented in a computer program for a PC having a recording unit, e.g. a DVD+RW drive.

FIG. 3 shows a sensor signal of a focus sensor. The sensor signal value in Volt is given in vertical direction, and a displacement of the focusing element 34 in μm in horizontal direction. In an optical storage drive sensors that measure the focus offset usually have a nonlinear characteristic as shown in FIG. 3, which is referred to as "s-curve" 38. A linear region 39 has a substantial proportional relation between the sensor signal and the displacement, and control systems of objective lens actuator in the optical drive usually operate in this linear region of the sensor. In the case of an external shock applied to the optical drive, the objective lens 34 will start moving with respect to the disc. As long as this displacement stays in the linear region, the control system will force the objective lens back to its correct position. If the displacement of the objective lens exceeds the boundaries of the linear region, the displacement can no longer be reconstructed from the sensor output so the control system has to be disabled and deflection of the objective lens gets disproportionately large. The linear region of the s-curve depends on the optical layout of the optical pick up unit of a drive. In a small form factor drive the linear region 39 happens to be very small order of ±2 μm), hence this drive is very sensitive to shocks.

For extending the operational range of the focus servo system the tail parts of the s-curve 38 need to be included. In the tail parts the relation between displacement and sensor signal is inverted. However in general the s-curve cannot be inverted, because a sensor output signal value may correspond to different displacements. Thereto the device comprises a multitude of piecewise converters. Each converter is for converting a range of the sensor signal values into a position signal, assuming the displacement is within a range corresponding to the conversion range. Further the device has a selection unit for selecting one of the position signals as the displacement signal based on an estimated displacement. The estimated displacement is determined by using a model of the displacements of the focusing element, for example an extrapolator that determines a velocity of the displacement based on previous values of the displacement. In an embodiment other signals are used for the estimation, e.g. signals from a separate shock sensor or signals based on the periodic nature of a rotating disc having warp or tilt. In an embodiment the estimated displacement is based on a separate displacement signal based on a total amount of reflected radiation. The total amount of reflected radiation may for example be determined by summing the sensor signals of all available partial detectors in a quadrant detector.

FIG. 4 shows a focus extension unit. The optical sensor 41 generates a sensor signal that depends nonlinearly on the displacement of the focusing element, for example the objective lens. The sensor signal is fed into each of three piecewise converters 42, 43, 44. The piecewise converters generate three candidate position signals 40 that represent the position of the objective lens. A selector unit 46 compares the three candidates with an estimated value and selects the signal that is closest to the estimated value provided by estimator 47. The estimator 47 extrapolates some samples from the past. Basically it includes a simple model of the moving focusing element, for example that during these few sample times the velocity is constant. The operation of the focus extension unit is explained with reference to FIGS. 5 to 8.

In an embodiment the estimator calculates a next estimate based on a number of preceding samples. The output of the estimator at instant k is called y[k], and the input u[k]. A basic extrapolator calculates the new value:

$$y[k]=2*u[k-1]-u[k-2]$$

In digital signal processing preceding samples are denoted by a polynomial using delay unit $z^{-1}$, hence $u[k-n]=z^{-n}*u[k]$. The function of the estimator is noted as:

$$y=(2z-1)/z^2*u.$$

In an embodiment the estimator has a calculation based on the first and third preceding sample. The function for digital processing is noted as follows:

$$y=(2z^2-1)/z^3*u.$$

In an embodiment the focus extension unit comprises a filter unit 45. The three candidate position signals 40 are filtered by the filter 45 to suppress noise. Three corresponding filtered position signals are provided to the selection unit 46 for comparing to the estimated displacement. A corresponding non-filtered version of the selected position signal is then passed as displacement signal 49 to the focus controller, while the filtered signal 48 is used to calculate a new estimate. Although the filtered signal might be used for the displacement signal, the non-filtered version is usually preferred because filtering incurs phase shifting, which may disturb the stability of the control loop.

In an embodiment the piecewise converters 42,43,44 comprise a lookup table. The lookup table provides position values for a large number of sensor signal values, a different table being provided for each converter for the relevant part of the s-curve. For example the first converter 42 has a range of position values corresponding to the linear part 39 of the s-curve. The sensor voltages are the input values for the lookup table, while the position (or a corresponding voltage) is the output of the lookup table. The values in the lookup table are determined by a calibration measurement of the s-curve. The calibration measurement may be performed during design of the device, or for an individual device during manufacture.

In an embodiment the piecewise converters 42,43,44 comprise a look-up table which is filled during a calibration process in the device itself. In the process the focusing actuator is fed by a linearly increasing control voltage, which results in a proportional change in the position of the focusing element. During the increase the sensor voltage is measured. The measured values are subdivided in a number of ranges, one range for each converter. Within a single range there are no overlapping sensor signal values, but overlap between the ranges occurs due to the shape of the s-curve. The calibration process may be performed for each record carrier after insertion, and/or during use in regular intervals, for example during idle time when no user data access is required.

FIG. 5 shows displacement of an objective lens. Horizontally time is given as a number of samples, and vertically the displacement in μm. The displacement 51 exceeds the linear region of the s-curve, so the resulting output voltage of the optical sensor is no longer within the linear range and therefore not a suitable input signal for a traditional focus controller.

FIG. 6 shows a sensor signal. A sensor voltage 61 is given vertically, and time horizontally. The corresponding displacement of the focusing element is given in FIG. 5. In a central linear part 62, roughly from time=45 samples to time=55 samples, the curve has a proportional relation between displacement and sensor voltage. In a first part 63 the sensor signal has an inverted relation to the displacement, overlapping with the linear part. In a last part 64 the sensor signal also has an inverted relation to the displacement, overlapping with the linear part. The sensor signal is fed into the three piecewise converters, which results in the three signals shown in FIG. 7.

FIG. 7a shows position signals for the tail parts of the s-curve. A fist position signal 71 is produced by the third converter 44. In particular a first part 72 shows a correct translation of the sensor voltage of the first part 63 of the s-curve to a displacement. A second position signal 74 is produced by the second converter 43. In particular a last part 73 shows a correct translation of the sensor voltage of the last part 64 of the s-curve to a displacement.

FIG. 7b shows a position signal for the central part of the s-curve. A position signal 75 is produced by the first converter 42. In particular a central part 75 shows a correct translation of the sensor voltage of the central part 62 of the s-curve to a displacement.

FIG. 7c shows a combination of position signals. A first part 72 of the position signal is connected to a central part 75, and continued with last part 73 of the position signals provided by the different converters. At the crossover points 76,77 the selector decides which signal comes closest to the estimated value. Hence the input displacement is reconstructed by the combined signal pieces.

FIG. 8 shows a reconstructed displacement signal. A displacement signal 80 is reconstructed by combining the position output signals from the converters as shown in FIG. 7. The reconstructed displacement corresponds to the input displacement shown in FIG. 5.

Although the invention has been mainly explained by embodiments using optical discs, the invention is also suitable for other record carriers such as rectangular optical cards, magneto-optical discs or any other type of information storage system that requires control of a focus element. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above.

The invention claimed is:

1. Device for scanning a track on a record carrier via a beam of radiation, the track comprising marks representing information, the device comprising
   a head (22) for providing the beam and generating at least one sensor signal, the head comprising
   a focusing element,
   a focusing unit (25) for controlling the focusing element (34) to maintain an in-focus position for generating a focused spot on the track in dependence on a displacement signal based on the sensor signal,
   the displacement signal being indicative of a displacement of the focusing element with respect to an in-focus position, the sensor signal having overlapping ranges of sensor signal values for different ranges of the displacement,
   wherein
   a multitude of piecewise converters (42,43,44), each converter converting a range of the sensor signal values into a first, second and third position signal, and
   selection means (46) for comparing the first, second and third position signals with an estimated displacement signal and for selecting one of the first, second or third position signals as the displacement signal based on an estimated displacement.

2. Device as claimed in claim 1, wherein the selection means (46) comprise an estimator (47) for determining the estimated displacement based on previous values of the displacement signal.

3. Device as claimed in claim 1, further comprising a filter unit (45), coupled to an output of said piecewise converters (42, 43, 44) an to an input of said selection means (46) for providing a multitude of filtered position signals based on the multitude of position signals, in particular the filter being a smoothing filter.

4. Device as claimed in claim 1, wherein at least one of the piecewise converters (42,43,44) has a substantially proportional relation between the range of the sensor signal values and the position signal, and at least one of the piecewise converters has a substantially inverse relation between the range of the sensor signal values and the position signal.

5. Device as claimed in claim 1, wherein at least one of the piecewise converters (42,43,44) comprises a conversion table for converting the range of the sensor signal values to the position signal.

6. Device as claimed in claim 1, wherein at least one of piecewise converters (42,43,44) comprises a conversion table for directly converting a number of sensor signal values in the range of the sensor signal values to the position signal, and an interpolator for converting sensor signal values that are intermediate in between said directly converted sensor signal values to the position signal.

7. Device as claimed in claim 1, wherein the device comprises a control unit (20) including a calibration unit (36) for performing a focus calibration in which the focusing element is controlled to at least one predetermined position and parameters of the piecewise converters and/or of the selection means are adjusted to the sensor signal corresponding to said predetermined position.

8. Method of scanning a track on a record carrier via a beam of radiation, the track comprising marks representing information, the method comprising
   generating at least one sensor signal,
   controlling a focusing element to maintain an in-focus position for generating a focused spot on the track in dependence on a displacement signal based on the sensor signal, the displacement signal being indicative of a displacement of the focusing element with respect to an in-focus position, the sensor signal having overlapping ranges of sensor signal values for different ranges of the displacement,
   converting a multitude of ranges of the sensor signal values into a multitude of position signals,
   comparing the multitude of position signals with an estimated displacement signal; and
   selecting one of the position signals as the displacement signal based on said comparison.

9. Device for scanning a track on a record carrier via a beam of radiation, the track comprising marks representing information, the device comprising
   a head (22) for providing the beam and generating at least one sensor signal, the head comprising
   a focusing element,
   a focusing unit (25) for controlling the focusing element (34) to maintain an in-focus position for generating a focused spot on the track in dependence on a displacement signal based on the sensor signal,
   the displacement signal being indicative of a displacement of the focusing element with respect to an in-focus position, the sensor signal giving overlapping ranges of sensor signal values for different ranges of the displacement,
   wherein
   a multitude of piecewise converters (42, 43, 44), each converter a range of the sensor signal values into a first, second and third position signal, and
   selection means (46) for comparing the first, second and third position signals with an estimated displacement signal and for selecting one of the first, second or third position signals as the displacement signal based on an estimated displacement,
   wherein the selection means (46) comprises an estimator (47) for determining the estimated displacement based on previous values of the displacement signal, and wherein the estimator (47) calculates as the estimated displacement $y=(2z^2-1)/z^3$; $z^{-1}$ indicating a delay unit in digital signal processing.

10. Device as claimed in claim 9, further comprising a filter unit (45), coupled to an output of said piecewise converters (42, 43, 44) an to an input of said selection means (46) for providing a multitude of filtered position signals based on the multitude of position signals, in particular the filter being a smoothing filter.

11. Device as claimed in claim 9, wherein at least one of the piecewise converters (42, 43, 44) has a substantially proportional relation between the range of the sensor signal values and the position signal, and at least one of the piecewise converters has a substantially inverse relation between the range of the sensor signal values and the position signal.

12. Device as claimed in claim 9, wherein at least one the piecewise converters (42, 43, 44) comprises a conversion table for converting the range of the sensor signal values to the position signal.

13. Device as claimed in claim 9, wherein at least one of piecewise converters (42, 43, 44) comprises a conversion table for directly converting a number of sensor signal values in the range of the sensor signal values to the position signal, and an interpolator for converting sensor signal values that are intermediate in between said directly converted sensor signal values to the position signal.

14. Device as claimed in claim 9, wherein the device comprises a control unit (20) including a calibration unit (36) for performing a focus calibration in which the focusing element is controlled to at least one predetermined position and parameters of the piecewise converters and/or of the selection means are adjusted to the sensor signal corresponding to said predetermined position.

\* \* \* \* \*